United States Patent
Roundy et al.

(10) Patent No.: US 10,089,469 B1
(45) Date of Patent: Oct. 2, 2018

(54) SYSTEMS AND METHODS FOR WHITELISTING FILE CLUSTERS IN CONNECTION WITH TRUSTED SOFTWARE PACKAGES

(71) Applicant: Symantec Corporation, Mountain View, CA (US)

(72) Inventors: Kevin Roundy, El Segundo, CA (US); Christopher Gates, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 127 days.

(21) Appl. No.: 14/737,528

(22) Filed: Jun. 12, 2015

(51) Int. Cl.
*G06F 21/57* (2013.01)

(52) U.S. Cl.
CPC ........ *G06F 21/57* (2013.01); *G06F 2221/033* (2013.01)

(58) Field of Classification Search
CPC .......... G06F 21/00; G06F 21/30; G06F 21/44; G06F 21/50; G06F 21/51; G06F 21/56; G06F 21/562; G06F 21/564; G06F 21/565; G06F 21/57; G06F 21/577; H04L 63/00; H04L 63/12; H04L 63/123; H04L 63/126; H04W 12/00; H04W 12/02; H04W 12/10
See application file for complete search history.

(56) References Cited

U.S. PATENT DOCUMENTS

| | | | |
|---|---|---|---|
| 8,190,611 B1 | 5/2012 | Nachenberg et al. | |
| 8,341,745 B1 | 12/2012 | Chau et al. | |
| 8,499,350 B1 * | 7/2013 | Satish | G06F 21/566 726/23 |
| 8,527,978 B1 * | 9/2013 | Sallam | G06F 8/65 713/161 |
| 9,805,115 B1 | 10/2017 | Satish | |
| 9,805,192 B1 | 10/2017 | Gates et al. | |
| 9,842,219 B1 | 12/2017 | Gates et al. | |
| 2006/0218642 A1 * | 9/2006 | Kuppusamy | G06F 21/51 726/26 |

(Continued)

OTHER PUBLICATIONS

Michael Hart, et al.; A System to identify machines infected by Malware Applying Linguistic Analysis; U.S. Appl. No. 14/226,626, filed Mar. 26, 2014.

(Continued)

*Primary Examiner* — Shanto Abedin
*Assistant Examiner* — Adrian Stoica
(74) *Attorney, Agent, or Firm* — FisherBroyles, LLP (57) ABSTRACT

The disclosed computer-implemented method for whitelisting file clusters in connection with trusted software packages may include (1) identifying a trusted file cluster that includes a set of clean files, (2) identifying an additional file cluster that includes a set of additional files that typically co-exist with the set of clean files included in the trusted file cluster on computing systems, (3) determining that the trusted file cluster and the additional file cluster represent portions of a single trusted software package, and then, in response to determining that the trusted file cluster and the additional file cluster represent portions of the single trusted software package, (4) merging the trusted file cluster and the additional file cluster into a merged file cluster and (5) whitelisting the merged file cluster. Various other methods, systems, and computer-readable media are also disclosed.

20 Claims, 7 Drawing Sheets

(56) References Cited

U.S. PATENT DOCUMENTS

| | | | | |
|---|---|---|---|---|
| 2009/0083852 | A1* | 3/2009 | Kuo | G06F 21/564 726/22 |
| 2011/0047594 | A1* | 2/2011 | Mahaffey | G06F 21/564 726/1 |
| 2012/0090025 | A1* | 4/2012 | Milner | G06F 21/564 726/22 |
| 2015/0180875 | A1* | 6/2015 | Kay | H04W 12/08 726/4 |

OTHER PUBLICATIONS

Acar Tamersoy, et al; Systems and Methods for Detecting Malware Using File Clustering; U.S. Appl. No. 14/273,503, filed May 8, 2014.

Chau, Duen H., et al., "Polonium: Tera-Scale Graph Mining and Inference for Malware Detection", http://www.cs.cmu.edu/~dchau/polonium_sdm2011.pdf, as accessed Mar. 18, 2014, (2011).

Denis, Frank "Discovering Malicious Domains Using Co-Occurrences", http://labs.opendns.com/2013/07/24/co-occurrences/?referred=1, as accessed Mar. 18, 2014, OpenDNS Security Labs Blog, (Jul. 24, 2013).

"McAfee Global Threat Intelligence; Comprehensive, cloud-based threat intelligence", http://www.mcafee.com/us/resources/data-sheets/ds-global-threat-intelligence.pdf, as accessed Mar. 18, 2014, Data Sheet, McAfee, Inc., (2010).

"McAfee GTI Reputation & Categorization Services", http://www.mcafee.com/us/threat-center/technology/gti-reputation-technologies.aspx, as accessed Mar. 18, 2014, McAfee, Inc., (2003).

"McAfee Global Threat Intelligence File Reputation Service; Best Practices Guide for McAfee VirusScan® Enterprise Software", https://kc.mcafee.com/resources/sites/MCAFEE/content/live/PRODUCT_DOCUMENTATION/24000/PD24043/en_US/48302wp_gti-best-practices_0812_fnl.pdf, as accessed Mar. 18, 2014, McAfee, Inc., (2012).

"FAQs for Global Threat Intelligence File Reputation", https://kc.mcafee.com/corporate/index?page=content&id=KB53735, as accessed Mar. 18, 2014, Knowledge Center, McAfee, Inc., (2003).

Jeffrey S. Wilhelm, et al; Systems and Methods for Anticipating File-Security Queries; U.S. Appl. No. 14/570,518, filed Dec. 15, 2014.

Christopher Gates, et al; Systems and Methods for Curating File Clusters for Security Analyses; U.S. Appl. No. 14/733,983, filed Jun. 9, 2015.

Christopher Gates, et al; Systems and Methods for File Classification; U.S. Appl. No. 14/751,178, filed Jun. 26, 2015.

Karampatziakis, Nikos et al., "Using File Relationships in Malware Classification", http://link.springer.com/chapter/10.1007/978-3-642-37300-8_1, as accessed May 26, 2015, Using File Relationships in Malware Classification, Detection of Intrusions and Malware, and Vulnerability Assessment Lecture Notes in Computer Science, 9th International Conference, DIMVA 2012, vol. 7591, Springer Berlin Heidelberg, Crete, Greece, (Jul. 26-27, 2012).

Ye, Yanfang et al., "Combining File Content and File Relations for Cloud Based Malware Detection", http://users.cis.fiu.edu/~taoli/pub/p222-malware.pdf, as accessed May 26, 2015, KDD'11, ACM, San Diego, California, (Aug. 21-24, 2011).

"Malheur", http://www.mlsec.org/malheur/, as accessed May 26, 2015, (Jan. 4, 2010).

"Application Whitelisting", https://www.bit9.com/solutions/application-whitelisting/, as accessed Mar. 30, 2015, Bit9, (Apr. 29, 2013).

"McAfee Application Control", www.mcafee.com/us/products/application-control.aspx, as accessed Mar. 30, 2015, (Dec. 12, 2010).

* cited by examiner

SYSTEMS AND METHODS FOR WHITELISTING FILE CLUSTERS IN CONNECTION WITH TRUSTED SOFTWARE PACKAGES

BACKGROUND

Individuals and organizations often seek to improve the security of their computing systems. One method of improving computer security involves adding software and files to a whitelist. Whitelists generally identify sets of trusted files. In one example, a computing system may achieve increased security by executing only whitelisted software packages. Whitelisting may be used in other ways as well. For example, a computer security system may gain certain efficiencies by forgoing security scans on whitelisted files since such files are already known to be trusted.

While whitelisting can be a powerful tool for improving system efficiency and/or preventing malicious files from harming a system, the ever-increasing quantity and/or complexity of software may make the process of creating and/or maintaining whitelists problematic and/or unwieldy. For example, some whitelisted software packages may call for updates that involve downloading additional and/or replacement files from the Internet. Unfortunately, because these additional and/or replacement files are not necessarily whitelisted, such files may trigger certain security events and/or alerts that interfere with the software's functionality. Accordingly, the instant disclosure identifies and addresses a need for additional and improved systems for whitelisting file clusters in connection with trusted software packages.

SUMMARY

As will be described in greater detail below, the instant disclosure describes various systems and methods for whitelisting file clusters in connection with trusted software packages. In one example, a computer-implemented method for whitelisting file clusters in connection with trusted software packages may include (1) identifying a trusted file cluster that includes a set of clean files, (2) identifying an additional file cluster that includes a set of additional files that typically co-exist with the set of clean files included in the trusted file cluster on computing systems, (3) determining that the trusted file cluster and the additional file cluster represent portions of a single trusted software package, and then, in response to determining that the trusted file cluster and the additional file cluster represent portions of the single trusted software package, (4) merging the trusted file cluster and the additional file cluster into a merged file cluster and (5) whitelisting the merged file cluster.

In some examples, identifying the additional file cluster may include detecting multiple requests for a reputation score for a file in the set of additional files. In one example, the multiple requests for the reputation score of the file in the additional files may exceed a threshold number of reputation score requests. In further examples, identifying the additional file cluster may include determining that the additional files co-exists with the clean files on a threshold number of systems. In one example, the threshold number of systems may increase over time.

Additionally or alternatively, determining that the trusted file cluster and the additional file cluster represent portions of the single trusted software package may include determining that the clean files and the additional files originate from a common source. In some embodiments, the common source may be a Uniform Resource Locator (URL). Additionally or alternatively, the common source may be a program that generated both the clean files and the additional files.

Moreover, determining that the trusted file cluster and the additional file cluster represent portions of the single trusted software package may include determining that the additional file cluster represents at least a partial update of the trusted software package. In some embodiments, determining that the additional file cluster represents a partial update of the trusted software package may include determining that the clean files and the additional files share an installation pathway. In additional or alternative embodiments, determining that the trusted file cluster and the additional file cluster represent portions of the single trusted software package may include determining that the clean files and the additional files are signed by the same code-signing authority.

In one embodiment, a system for implementing the above-described method may include (1) an identification module, stored in memory, that (A) identifies a trusted file cluster that includes a set of clean files and (B) identifies an additional file cluster that includes a set of additional files that typically co-exist with the clean files included in the trusted file cluster on computing systems, (2) a determination module, stored in memory, that determines that the trusted file cluster and the additional file cluster represent portions of a single trusted software package, (3) a merging module, stored in memory, that merges, in response to determining that the trusted file cluster and the additional file cluster represent portions of the single trusted software package, the trusted file cluster and the additional file cluster into a merged file cluster, (4) a whitelisting module, stored in memory, that whitelists the merged file cluster, and (5) at least one physical processor configured to execute the identification module, the determination module, the merging module, and the whitelisting module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a trusted file cluster that includes a set of clean files, (2) identify an additional file cluster that includes a set of additional files that typically co-exist with the clean files included in the trusted file cluster on computing systems, (3) determine that the trusted file cluster and the additional file cluster represent portions of a single trusted software package, and then, in response to determining that the trusted file cluster and the additional file cluster represent portions of the single trusted software package, (4) merge the trusted file cluster and the additional file cluster into a merged file cluster and (5) whitelist the merged file cluster.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for whitelisting file clusters in connection with trusted software packages. As will be explained in greater detail below, systems and methods described herein may automatically update whitelists by identifying and merging file clusters that represent portions of the same trusted software package. Systems and methods herein may then whitelist the entire merged file cluster based on a determination that the file clusters represent portions of the same trusted software package. Such automated whitelisting may enable software that uses the whitelists to operate efficiently without manual intervention, even in the face of alterations and/or updates to the trusted software package that might otherwise cause portions of the trusted software package to no longer be whitelisted. Additionally or alternatively, automatic whitelisting of files associated with a trusted software package may allow safe, unsigned files that are distributed with an approved software package to be installed on systems that apply whitelisting technologies.

Figure 1:
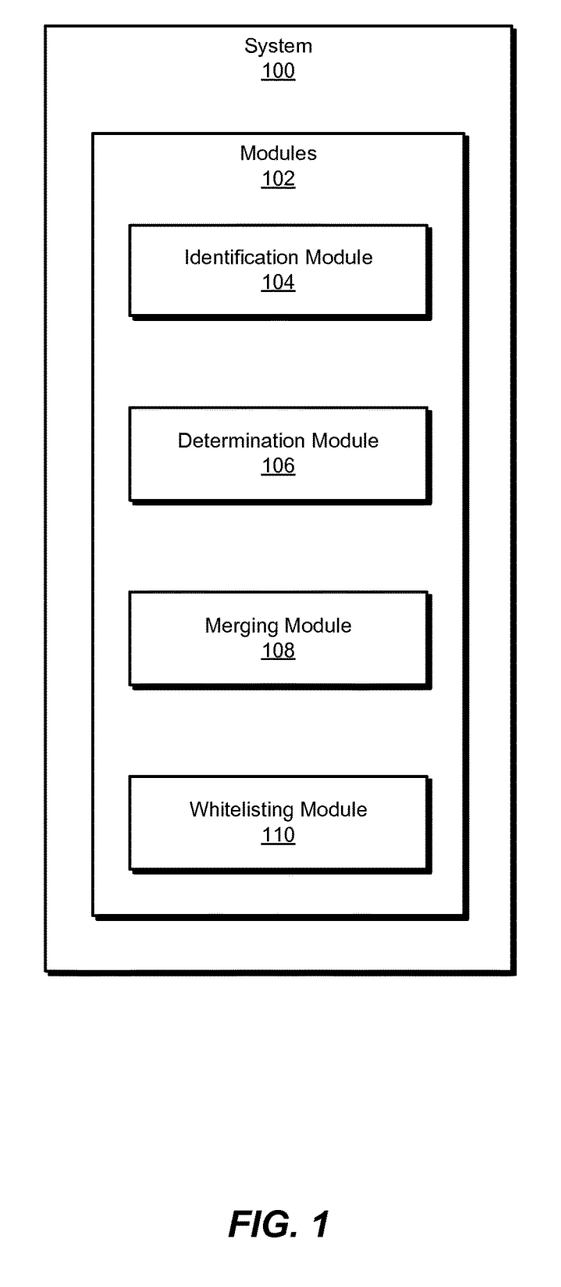
FIG. 1 is a block diagram of an exemplary system for whitelisting file clusters in connection with trusted software packages.
Figure 2:
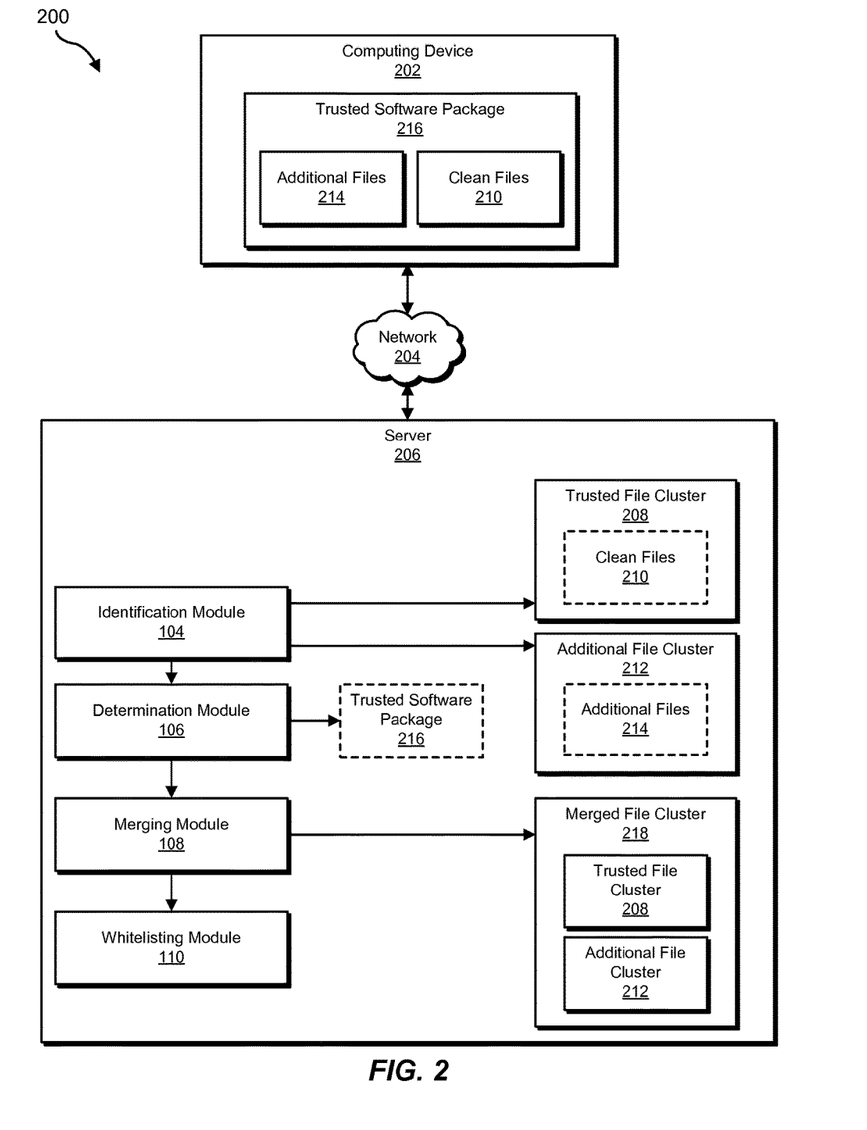
FIG. 2 is a block diagram of an additional exemplary system for whitelisting file clusters in connection with trusted software packages.

The following will provide, with reference to FIGS. 1 and 2, detailed descriptions of exemplary systems for whitelisting file clusters in connection with trusted software packages. Detailed descriptions of corresponding computer-implemented methods will also be provided in connection with FIG. 3. Detailed descriptions of exemplary systems for identifying software packages will be provided in connection with FIG. 4. Detailed descriptions of exemplary systems for determining that a set of files is part of a trusted software package will be provided in connection with FIG. 5. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for whitelisting file clusters in connection with trusted software packages. As illustrated in this figure, exemplary system 100 may include one or more modules 102 for performing one or more tasks. For example, and as will be explained in greater detail below, exemplary system 100 may include an identification module 104 that identifies a trusted file cluster that includes a set of clean files. Identification module 104 may also identify an additional file cluster that includes a set of additional files. Exemplary system 100 may additionally include a determination module 106 that determines that the trusted file cluster and the additional file cluster represent portions of a single trusted software package. Moreover, exemplary system 100 may include a merging module 108 that merges the trusted file cluster and the additional file cluster into a merged file cluster. Furthermore, exemplary system 100 may include a whitelisting module 110 that whitelists the merged file cluster. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102. Additionally or alternatively, server 206 may be programmed with one or more of modules 102.

In one embodiment, one or more of modules 102 from FIG. 1 may, when executed by at least one processor of computing device 202 and/or server 206, enable computing device 202 and/or server 206 to automatically whitelist files based on the files being associated with a trusted software package. For example, and as will be described in greater detail below, one or more of modules 102 may cause computing device 202 and/or server 206 to whitelist file clusters in connection with trusted software packages. In one example, and as will be described in greater detail below, identification module 104 may identify a trusted file cluster 208 that includes clean files 210. Identification module 104 may also identify an additional file cluster 212 that includes additional files 214 that typically co-exist with clean files 210 on computing systems. Determination module 106 may determine that trusted file cluster 208 and additional file cluster 212 represent portions of a trusted software package 216. Merging module 108 may, in response to the determination that trusted file cluster 208 and additional file cluster 212 represent portions of trusted software package 216, merge trusted file cluster 208 and additional file cluster 212 into a merged file cluster 218. Whitelisting module 110 may then whitelist merged file cluster 218.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, virtual machines, virtual containers, combinations of one or more of the same, exemplary computing system 610 in FIG. 6, or any other suitable computing device. The terms "computing device" and "computing system" may be used interchangeably throughout the instant disclosure.

Server 206 generally represents any type or form of computing device capable of curating file clusters for file analyses. Examples of server 206 include, without limitation, security servers, application servers, web servers, storage servers, and/or database servers configured to run certain software applications and/or provide various security, web, storage, and/or database services. Although illustrated as a single device in FIG. 2, server 206 may represent a plurality of servers working in conjunction with one another.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Trusted file cluster 208, additional file cluster 212, and merged file cluster 218 are examples of file clusters. The term "file cluster," as used herein, generally refers to any type or form of collection of files associated with one another in some way. Systems that identify file clusters may do so based on similarities in traits, characteristics, attributes, and/or behaviors of the files. Examples of such traits, characteristics, attributes, and/or behaviors include, without limitation, the installation pathways of the files, the times at which the files were installed, the origins of the files, the code-signing authorities that signed the files, systems on which the files are installed, or any other suitable information that describes a file.

Files in the same cluster may, by virtue of being associated with each other via the cluster, be treated similarly by various programs. For example, a virus scanning application may use a particular set of rules when examining files in one cluster, and a different set of rules when examining files in a different cluster. As a specific example, a virus scanning application may skip and/or forego scanning whitelisted file clusters in order to speed up scan times. File clusters may be determined in a variety of ways, including but not limited to examining similarities in file installation pathways, whether or not the files are signed by the same code-signing authority, similarities in the time of installation, similarities in file sources (e.g., whether or not the files were downloaded from the same URL), combinations of one or more of the same, or any other suitable method of measuring whether or not a group of files should be associated with each other.

Trusted software package 216 represents a software package that is known to be trustworthy and/or non-malicious. A software package generally represents any collection of files and information about those files that provides a certain functionality as part of a larger system. For example, many modern software applications are distributed as packages that include at least one executable file, several library files, and other miscellaneous support files. As a specific example, the software application ADOBE READER enables an operating system to open PORTABLE DOCUMENT FORMAT (.PDF) files. Files required for the execution of ADOBE READER may be gathered into a single software package that represents the application as a whole.

Clean files 210 generally represents any collection of files that are known to be trustworthy and/or non-malicious. Clean files 210 may be known as trustworthy and/or non-malicious by satisfying a security inspection, including but not limited to virus scans, malware scans, meeting a reputation score threshold, user verification that the files satisfy the security inspection, or any other inspection that indicates and/or suggests the trustworthiness of clean files 210. In some examples, clean files 210 may be clustered together as part of trusted file cluster 208 for a variety of reasons. Additionally, clean files 210 may represent all or a portion of trusted software package 216.

Additional files 214 generally represents any collection of files whose trustworthiness, identity, and/or associations are not initially known. Additional files 214 may include and/or represent updated versions of some or all of clean files 210. Moreover, additional files 214 may include and/or represent new files (in addition to clean files 210) developed and/or released in connection with trusted software package 216. Additional files 214 may have undergone certain security inspections similar to those performed on clean files 210. However, contrary to clean files 210, additional files 214 may initially remain unwhitelisted.

Figure 3:
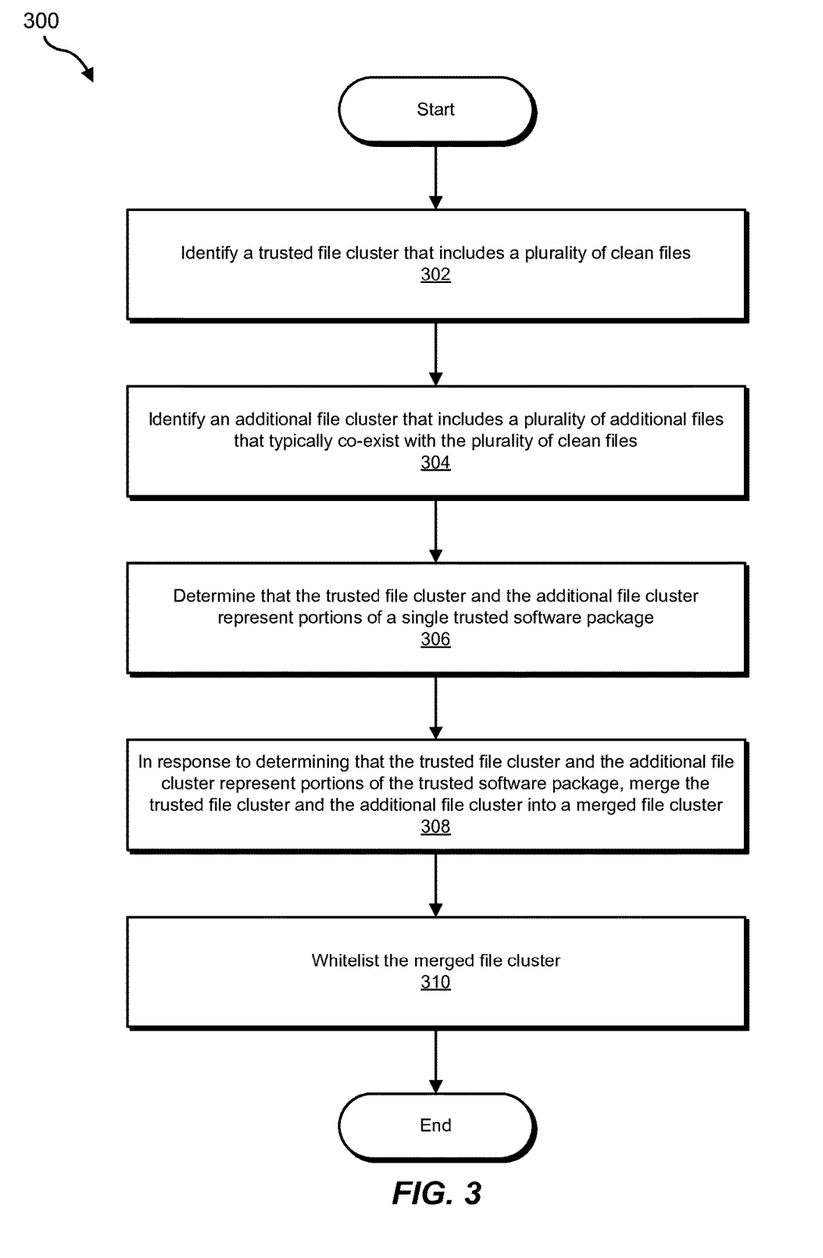
FIG. 3 is a flow diagram of an exemplary method for whitelisting file clusters in connection with trusted software packages.

FIG. 3 is a flow diagram of an exemplary computer-implemented method 300 for whitelisting file clusters in connection with trusted software packages. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may identify a trusted file cluster that includes a set of clean files. For example, identification module 104 may, as part of server 206 in FIG. 2, identify trusted file cluster 208 that includes clean files 210.

Identification module 104 may identify trusted file cluster 208 in a variety of ways. In one embodiment, identification module 104 may identify trusted file cluster 208 based at least in part on a user input. For example, a user may manually identify a set of trusted files that are associated with a software package. As a specific example, a system administrator may inform identification module 104 that a particular file cluster should be trusted. In these examples, identification module 104 may then identify the particular file cluster as trusted file cluster 208. In a similar example, a user may designate a software package as a trusted software package (e.g., trusted software package 216). Identification module 104 may accordingly identify the files contained in the software package at the time of designation as trusted file cluster 208.

Additionally or alternatively, identification module 104 may automatically identify trusted file cluster 208 based at least in part on a security scan performed by a computer security system. For example, an anti-malware program may scan a file cluster and establish that the files included in the file cluster do not contain malware or other undesirable features, thus establishing the files as clean files 210. Identification module 104 may then identify the file cluster containing clean files 210 as trusted file cluster 208.

Returning to FIG. 3, at step 304, one or more of the systems described herein may identify an additional file cluster that includes a set of additional files that typically co-exist with the clean files included in the trusted file cluster on computing systems. For example, identification module 104 may, as part of server 206 in FIG. 2, identify additional file cluster 212 that includes additional files 214 that typically co-exist with clean files 210 on computing systems.

Identification module 104 may identify the additional file cluster in a variety of ways. For example, identification module 104 may identify additional file cluster 212 based at least in part on the number of computing devices that include and/or host both additional files 214 and clean files 210. In a specific example, identification module 104 may observe significant overlap between computing devices that host trusted file cluster 208 and computing devices that host additional file cluster 212. In such examples, identification module 104 may identify additional file cluster 212 by determining that additional files 214 co-exist with clean files 210 on a threshold number or percentage of systems.

In some examples, identification module 104 may, over time, increase the threshold number of systems required to identify additional file cluster 212 as co-existing with trusted file cluster 208. As a specific example, additional file cluster 212 may represent an update to trusted software package 216. When the update is first released, only a small number of computing systems may host both the software package and the updated files because software updates take time to be distributed to and/or installed on various computing systems. However, more computing systems may host both the software package and the updated files as time goes on and more computing systems receive and apply the software update.

Identification module 104 may use other methods to identify additional file cluster 212 besides co-existence and/or co-occurrence with trusted file cluster 208. In some examples, identification module 104 may identify additional file cluster 212 by detecting multiple requests for a reputation score for at least one file in the set of additional files 214. In this example, identification module 104 may operate as part of a server (e.g., server 206) that provides reputation information about files to a number of computing systems.

Identification module 104 may apply various metrics to the detected requests as part of identifying additional files 214 as additional file cluster 212. For example, identification module 104 may detect and/or observe certain requests for reputation scores for additional files 214. In this example, the number of detected and/or observed requests for such reputation scores may exceed a certain number or percentage of all reputation score requests handled by the server. At this point, identification module 104 may identify additional files 214 as additional file cluster 212, thereby potentially triggering the application of certain rules for associating and/or merging additional file cluster 212 with trusted file cluster 208. This "flood" of reputation score requests may represent various events including but not limited to a software update for trusted software package 216.

Figure 4:
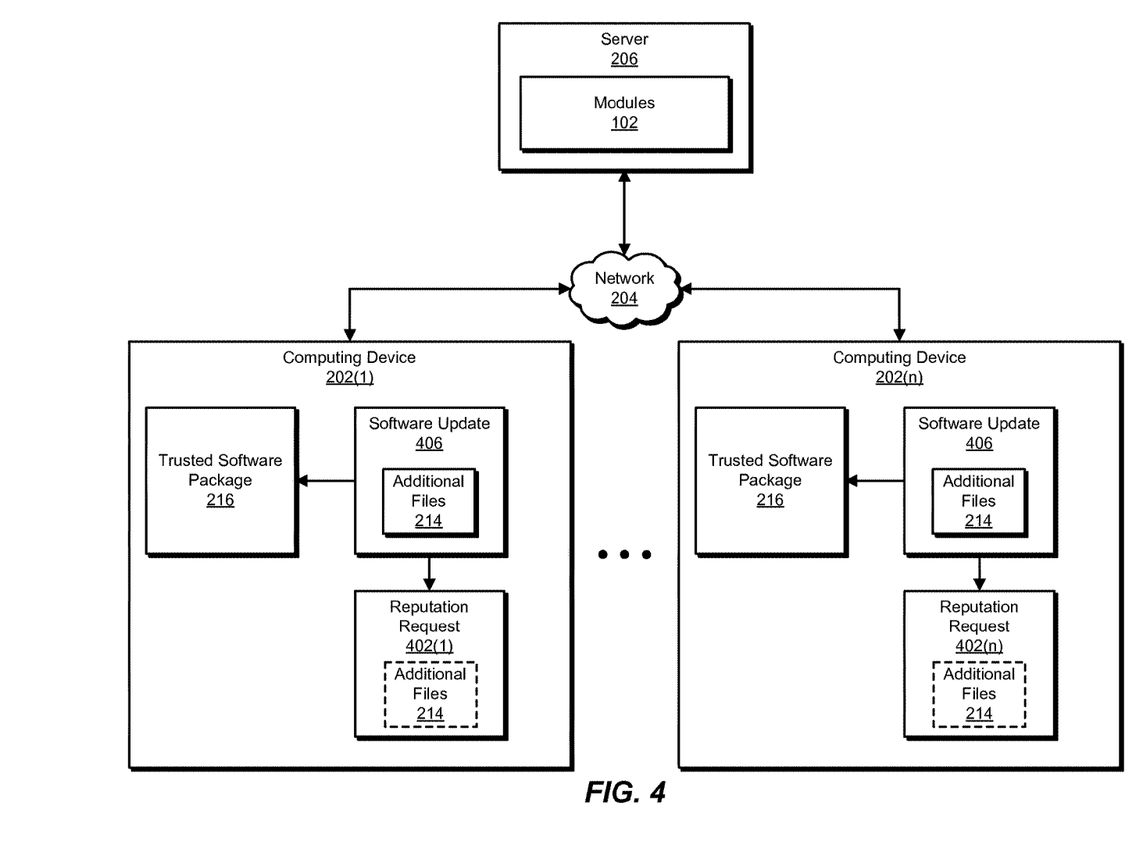
FIG. 4 is a block diagram of an exemplary computing system for identifying trusted software packages.

As an illustrated example and with reference to FIG. 4, modules 102 may operate as part of server 206 that provides reputation information to computing devices 202(1)-(n). Trusted software package 216 may be installed on each of computing devices 202(1)-(n). A publisher of trusted software package 216 may push a software update 406 containing additional files 214 to computing devices 202(1)-(n). As each of computing devices 202(1)-(N) receives additional files 214, each computing device may request reputation information for additional files 214 from server 206 by way of a reputation request 402. If reputation requests for additional files 214 exceed a threshold number or percentage of all reputation requests handled by server 206, identification module 104 may identify additional files 214 as additional file cluster 212.

Returning to FIG. 3, at step 306, one or more of the systems described herein may determine that the trusted file cluster and the additional file cluster represent portions of a single trusted software package. For example, determination module 106 may, as part of server 206 in FIG. 2, determine that trusted file cluster 208 and additional file cluster 212 represent portions of trusted software package 216.

Determination module 106 may use a variety of metrics to determine that trusted file cluster 208 and additional file cluster 212 represent portions of trusted software package 216. In some examples, determination module 106 may determine that trusted file cluster 208 and additional file cluster 212 represent portions of trusted software package 216 by determining that clean files 210 and additional files 214 originated from a common source. In one example, determination module 106 may determine that clean files 210 and additional files 214 originated from the common source by determining that clean files 210 and additional files 214 originated from a single Uniform Resource Locator (URL). For example, a computing system may download software from a particular URL and later receive updates to the software from the same URL.

As a specific example, a computing system may host a trusted software package that contains clean files 210 for the application ADOBE READER. The computing system may have downloaded clean files 210 from a particular file server. The computing system may later receive additional files 214 as part of an update to ADOBE READER from the file server. Determination module 106 may, based on clean files 210 and additional files 214 originating from the same file server, determine that trusted file cluster 208 and additional file cluster 212 each represent portions of the trusted software package for ADOBE READER.

Additionally or alternatively, determination module 106 may determine that the set of clean files and the set of additional files originated from the common source by determining that the common source is a program that generated the set of clean files and the set of additional files. For example, determination module 106 may determine that clean files 210 and additional files 214 were generated by the same file. The "parent" file that generated clean files 210 and additional files 214 may be any suitable file that is capable of generating other files. For example, determination module 106 may determine that a download manager application that handles updates for ADOBE READER saved clean files 210 and additional files 214 to computing device 202.

Determination module 106 may additionally or alternatively use other metrics besides common source to determine that the trusted file cluster and the additional file cluster represent portions of the same software package. For example, identification module 104 may identify that trusted file cluster 208 and additional file cluster 212 represent portions of software package 216 by determining that additional file cluster 212 represents at least a partial update of trusted software package 216. In some examples, additional files 214 may replace some or all of clean files 210 during the update process. Alternatively, additional files 214 may supplement clean files 210 as part of trusted software package 216 without replacing any of clean files 210. Regardless of whether or not any of additional files 214 replace any of clean files 210, additional files 214 may represent part of a different file cluster than clean files 210. Because additional files 214 are not part of the same file cluster as clean files 210, additional files 214 may remain unwhitelisted, thus interfering with the proper operation of some or all of a computing system or application. Determination module 106 may determine that additional file cluster 212 represents an update of trusted software package 216 in a variety of ways.

In some examples, determination module 106 may determine that the additional file cluster represents the partial update of the trusted software package by determining that the set of clean files and the set of additional files share an installation pathway. Files that are installed to the same directory generally share some sort of relationship. For example, files installed to the "C:\WINDOWS" folder of a computer are usually associated with an operating system software package. As an additional example, files and folders installed to the directory "C:\Program Files\Adobe\Adobe Photoshop" might be part of the ADOBE PHOTOSHOP software package. In general, as the similarity between the install paths of two files or file clusters increases so too may the likelihood that the files or file clusters are part of the same software package.

In some examples, determination module 106 may use the time of installation of files in determining whether or not the additional file cluster represents a portion of the software package. Determination module 106 may, by using the time of installation, allow safe, unsigned files that are distributed with an approved software package to be installed on computing systems that apply whitelisting technologies. For example, determination module 106 may determine that clean files 210 and additional files 214 were installed on computing device 202 within a certain amount of time of each other. In this example, determination module 106 may determine that trusted file cluster 208 and additional file cluster 212 represent portions of trusted software package 216 based at least in part on the contents of both trusted file cluster 208 and additional file cluster 212 being delivered to computing device 202 within the certain amount of time of each other.

Additionally or alternatively, determination module 106 may determine that the trusted file cluster and the additional file cluster represent portions of the single trusted software package by determining that the set of clean files and the set of additional files are signed by the same code-signing authority. For example, software publishers generally send an entire software package to be signed by a single code-signing authority. In this example, determination module 106 may determine that trusted file cluster 208 and additional file cluster 212 represent portions of trusted software package 216 based at least in part on digital signatures or certificates attached to clean files 210 and additional files 214 by a code-signing authority. Determination module 106 may ensure that both clean files 210 and additional files 214 were signed by a single code-signing authority. By ensuring that clean files 210 and additional files 214 were signed by the same code-signing authority, determination module 106 may be more confident that trusted file cluster 208 and additional file cluster 212 are part of the same software package.

Figure 5:
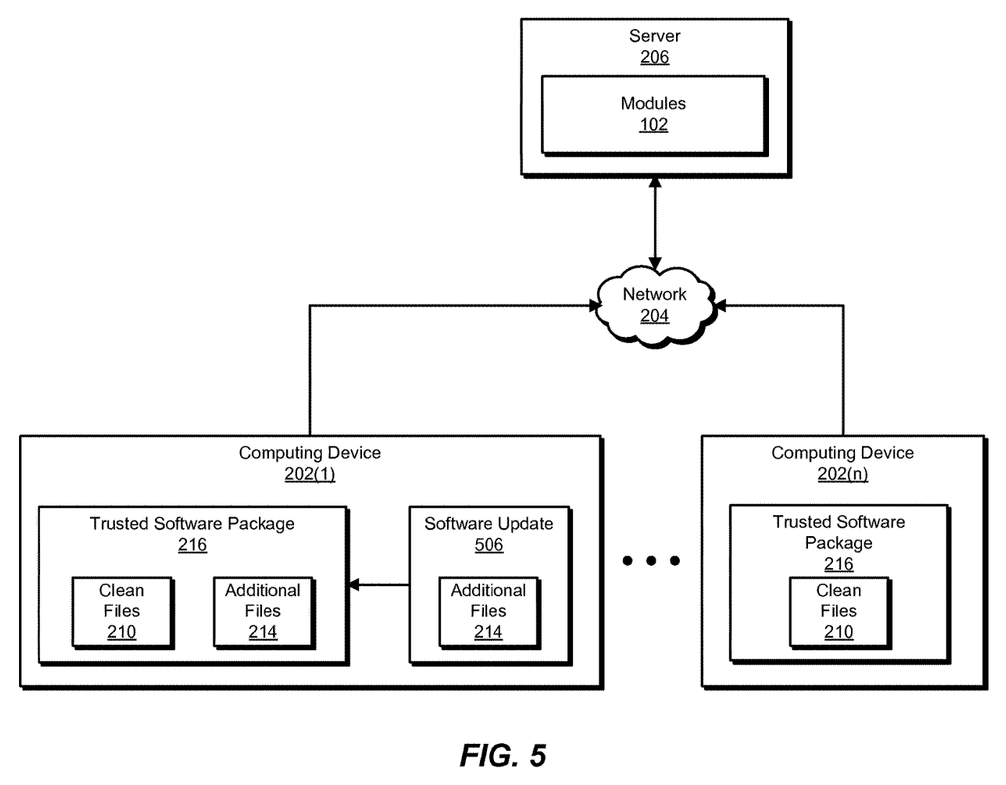
FIG. 5 is a block diagram of an exemplary computing system for identifying file clusters that represent portions of a trusted software package.

Additional files 214 need not be present on every computing system linked to a server in order for modules 102 to identify additional file cluster 212 as representing all or a portion of trusted software package 216. For example, some computing systems linked to server 206 may receive additional files 214, while other computing systems may not receive additional files 214. As a specific example, some users on a network may choose to update their versions of ADOBE READER while other users on the network may choose to forego the update. As illustrated in FIG. 5, server 206 may provide reputation information for computing device 202(1)-(n). In this example, a publisher of trusted software package 216 may issue a software update 506 that contains additional files 214.

In some examples, modules 102 may, at this point, not yet recognize additional files 214 as part of trusted software package 216 even though additional files 214 represent an update to trusted software package 216. After the update completes, computing device 202(1) may host a version of trusted software package 216 that contains clean files 210 and additional files 214. On the other hand, computing device 202(n) may not have received or installed software update 506. Accordingly, the version of trusted software package 216 on computing device 202(n) may contain clean files 210 but not contain additional files 214. Regardless of these differences, modules 102 may nevertheless identify additional files 214 and additional file cluster 212 as representing all or a portion of trusted software package 216.

Returning to FIG. 3 at step 308, one or more of the systems described herein may merge the trusted file cluster and the additional file cluster into a merged file cluster. For example, merging module 108 may, as part of server 206 in FIG. 2, merge trusted file cluster 208 and additional file cluster 212 into merged file cluster 218.

Merging module 108 may merge trusted file cluster 208 with additional file cluster 212 in a variety of ways. For example, merging module 108 may record in a database that clean files 210 and additional files 214 are part of merged file cluster 218. Additionally or alternatively, merging module 108 may record in a database that trusted file cluster 208 and additional file cluster 212 are sub-clusters of merged file cluster 218.

In some examples, merging module 108 may associate clean files 210 of trusted file cluster 208 with additional files 214 as part of additional file cluster 212. Additionally or alternatively, merging module 108 may associate additional files 214 of additional file cluster 212 with clean files 210 as part of trusted file cluster 208. In both of these examples, the merged cluster that contains both clean files 210 and additional files 214 may be treated as merged file cluster 218.

Returning to FIG. 3, at step 310, one or more of the systems described herein may whitelist the merged file cluster. For example, whitelisting module 110 may, as part of server 206 in FIG. 2, whitelist merged file cluster 218.

Whitelisting module 110 may whitelist merged file clusters in a variety of ways. For example, whitelisting module 110 may individually whitelist each file in merged file cluster 218. Alternatively, whitelisting module 110 may indicate that all files within merged file cluster 218 should be whitelisted.

As explained in greater detail above, systems and methods described herein may automatically upkeep whitelists by identifying file clusters that represent portions of a single trusted software package, thus allowing administrators to whitelist entire software packages based on identifying a single trusted element of the software package, even in the face of updates to the software package. Systems and methods described herein may then merge the file clusters into a merged file cluster and whitelist the entire merged file cluster based on some elements of the merged file cluster being whitelisted. Such automated whitelisting may enable software that uses the whitelists to operate efficiently without manual intervention, even in the face of alterations or updates to the trusted software package that might otherwise cause portions of the trusted software package to no longer be whitelisted. Additionally or alternatively, automatic whitelisting of files associated with a trusted software package may allow safe unsigned files that are distributed with an approved software package to be installed on systems that make use of whitelists.

Figure 6:
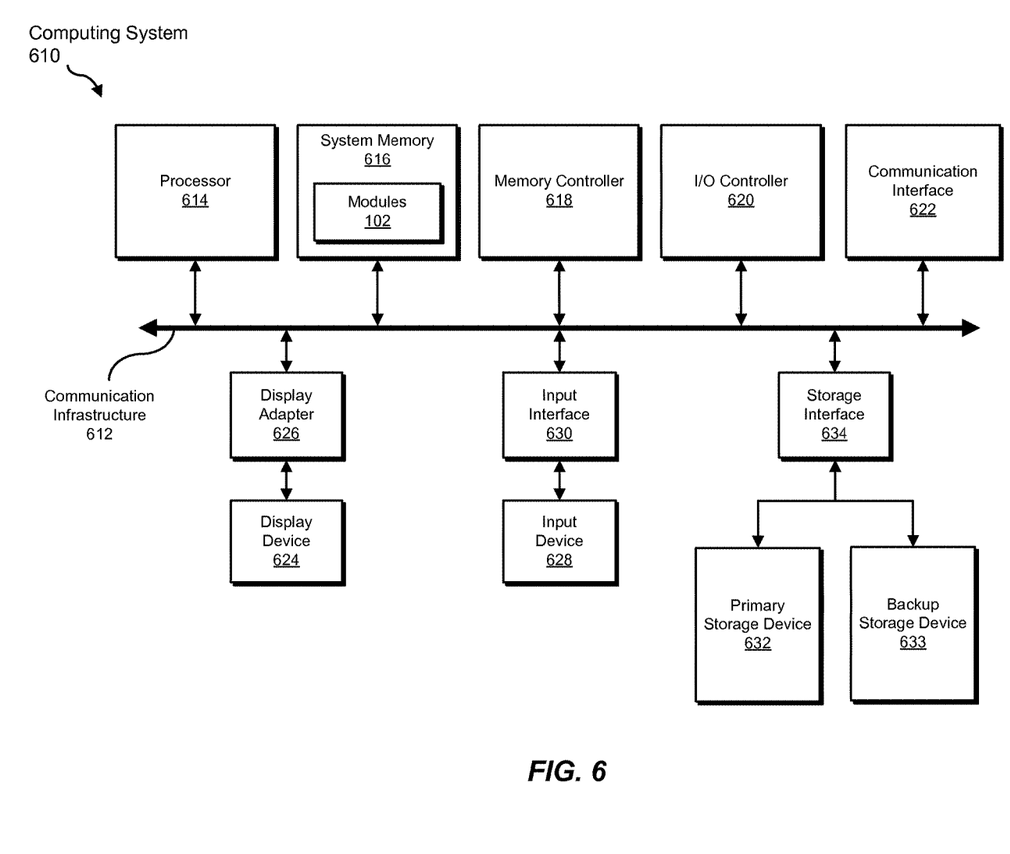
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
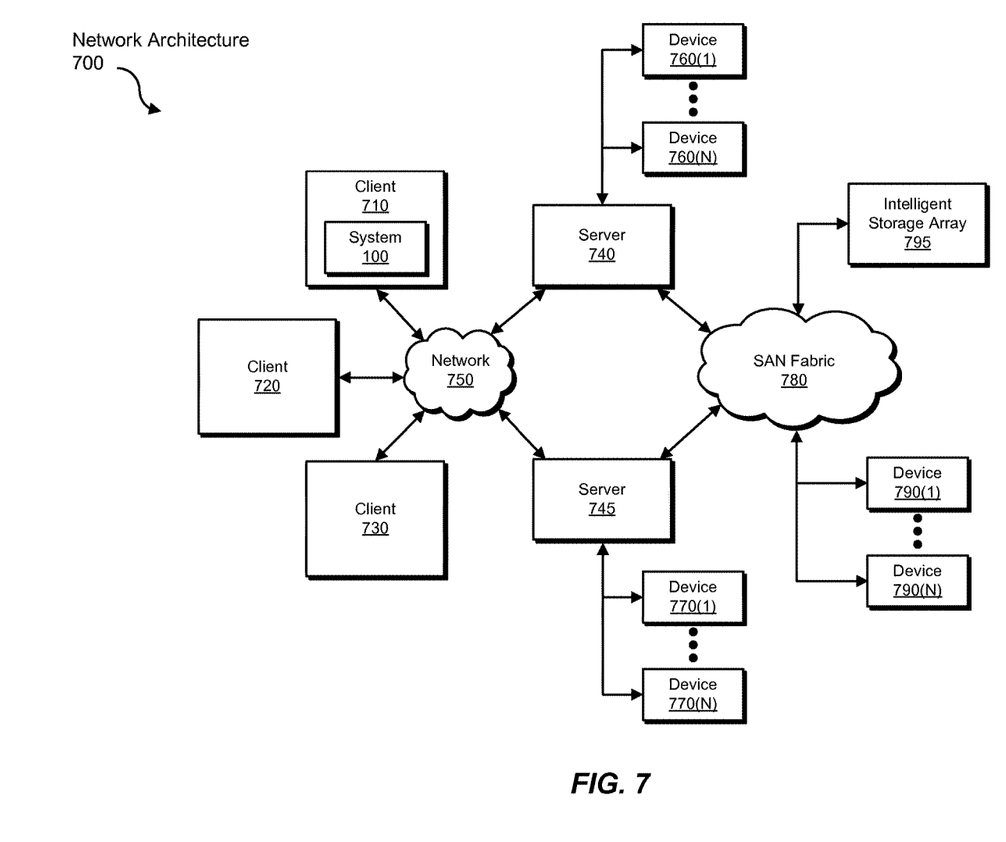
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for whitelisting file clusters in connection with trusted software packages.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive information indicating relationships between files to be transformed, transform the information into file clusters, identify further relationships between file clusters, use the relationship information to merge the file clusters, use the merged file clusters to whitelist a group of files, and output a result of the transformation to a database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for whitelisting file clusters in connection with trusted software packages, at least a portion of the method being performed by a computing device comprising at least one processor, the method comprising:
   identifying, based on files present on a plurality of computing systems and by a backend server that curates file clusters for the plurality of computing systems, a trusted file cluster that comprises a plurality of clean files, the plurality of clean files representing at least a portion of a single software package;
   identifying, based on the files present on the plurality of computing systems and by the backend server, an additional file cluster that:
      is not, at the time that the additional file cluster is identified, recognized as part of the single software package; and
      includes a plurality of additional files in which each file in the plurality of additional files co-exists with the plurality of clean files included in the trusted file cluster on at least a threshold percentage of computing systems in the plurality of computing systems;
   determining that the trusted file cluster and the additional file cluster each represent portions of the single trusted software package; and
   in response to determining that the trusted file cluster and the additional file cluster represent portions of the single trusted software package:
      merging the trusted file cluster and the additional file cluster into a merged file cluster;
      whitelisting the merged file cluster on a whitelist that describes files that are explicitly approved for use on computing devices that utilize the whitelist; and
      using the whitelist to treat files represented on the whitelist at a lower level of security than files that are not represented on the whitelist.

2. The method of claim 1, wherein identifying the additional file cluster comprises detecting multiple requests for a reputation score for at least one file in the plurality of additional files.

3. The method of claim 2, wherein the multiple requests for the reputation score of the file in the plurality of additional files exceed a threshold number of reputation score requests.

4. The method of claim 1, wherein determining that the trusted file cluster and the additional file cluster represent portions of the single trusted software package comprises determining that the plurality of clean files and the plurality of additional files originate from a common source.

5. The method of claim 4, wherein determining that the plurality of clean files and the plurality of additional files originate from the common source comprises determining that the plurality of clean files and the plurality of additional files originated from a single Uniform Resource Locator (URL).

6. The method of claim 4, wherein determining that the plurality of clean files and the plurality of additional files originate from the common source comprises determining that the common source is a program that generated the plurality of clean files and the plurality of additional files.

7. The method of claim 1, wherein determining that the trusted file cluster and the additional file cluster represent portions of the single trusted software package comprises determining that the additional file cluster represents at least a partial update of the trusted software package.

8. The method of claim 7, wherein determining that the additional file cluster represents the partial update of the trusted software package comprises determining that the plurality of clean files and the plurality of additional files share an installation pathway.

9. The method of claim 1, wherein determining that the trusted file cluster and the additional file cluster represent portions of the single trusted software package comprises determining that the plurality of clean files and the plurality of additional files are signed by the same code-signing authority.

10. The method of claim 1, wherein the threshold percentage of computing systems comprises a percentage of the total number of computing systems in the plurality of computing systems that utilize the whitelist.

11. The method of claim 1 wherein the threshold percentage of computing systems increases over time.

12. The method of claim 1, wherein determining that the trusted file cluster and the additional file cluster represent portions of the single trusted software package comprises determining that the trusted file cluster and the additional file cluster were delivered to a computing system within a predetermined length of time of each other.

13. A system for whitelisting file clusters in connection with trusted software packages, the system comprising:
    an identification module, stored in a non-transitory memory of the system, that:
        identifies, based on files present on a plurality of computing systems and by a backend server that curates file clusters for the plurality of computing systems, a trusted file cluster comprising a plurality of clean files, the plurality of clean files representing at least a portion of a single software package; and
        identifies, based on the files present on the plurality of computing systems and by the backend server, an additional file cluster that:
            is not, at the time that the additional file cluster is identified, recognized as part of the single software package; and
            includes a plurality of additional files in which each file in the plurality of additional files co-exists with the plurality of clean files included in the trusted file cluster on at least a threshold percentage of computing systems in the plurality of computing systems;
    a determination module, stored in the memory, that determines that the trusted file cluster and the additional file cluster each represent portions of the single trusted software package;
    a merging module, stored in the memory, that, in response to determining that the trusted file cluster and the additional file cluster represent portions of the single trusted software package, merges the trusted file cluster and the additional file cluster into a merged file cluster;
    a whitelisting module, stored in the memory, that:
        whitelists the merged file cluster on a whitelist that describes files that are explicitly approved for use on computing devices that utilize the whitelist; and
        uses the whitelist to treat files on the whitelist at a lower level of security than files that are not represented on the whitelist; and
    at least one physical processor configured to execute the identification module, the determination module, the merging module, and the whitelisting module.

14. The system of claim 13, wherein the identification module identifies the additional file cluster by detecting multiple requests for a reputation score for at least one file in the plurality of additional files.

15. The system of claim 14, wherein the multiple requests for the reputation score of the file in the plurality of additional files exceed a threshold number of reputation score requests.

16. The system of claim 13, wherein the determination module determines that the trusted file cluster and the additional file cluster represent portions of the single trusted software package by determining that the plurality of clean files and the plurality of additional files originate from a common source.

17. The system of claim 16, wherein the determination module determines that the plurality of clean files and the plurality of additional files originate from the common source by determining that the plurality of clean files and the plurality of additional files originated from a single Uniform Resource Locator (URL).

18. The system of claim 16, wherein the determination module determines that the plurality of clean files and the plurality of additional files originate from the common source by determining that the common source is a program that generated the plurality of clean files and the plurality of additional files.

19. The system of claim 13, wherein the determination module determines that the trusted file cluster and the additional file cluster represent portions of the single trusted software package by determining that the additional file cluster represents at least a partial update of the trusted software package.

20. A non-transitory computer-readable medium comprising one or more computer-readable instructions that, when executed by at least one processor of a computing device, cause the computing device to:
    identify, based on files present on a plurality of computing systems and by a backend server that curates file clusters for the plurality of computing systems, a trusted file cluster that comprises a plurality of clean files, the plurality of clean files representing at least a portion of a single software package;
    identify, based on the files present on the plurality of computing systems and by the backend server, an additional file cluster that:
        is not, at the time that the additional file cluster is identified, recognized as part of the single software package; and
        includes a plurality of additional files in which each file in the plurality of additional files co-exists with the plurality of clean files included in the trusted file cluster on at least a threshold percentage of computing systems in the plurality of computing systems;
    determine that the trusted file cluster and the additional file cluster each represent portions of the single trusted software package; and
    in response to determining that the trusted file cluster and the additional file cluster represent portions of the single trusted software package:
        merge the trusted file cluster and the additional file cluster into a merged file cluster;
        whitelist the merged file cluster on a whitelist that describes files that are explicitly approved for use on computing devices that utilize the whitelist; and
        use the whitelist to treat files represented on the whitelist at a lower level of security than files that are not represented on the whitelist.

* * * * *